(No Model.) 3 Sheets—Sheet 1.
C. RICHTER.
ELECTRIC RAILWAY.
No. 439,428. Patented Oct. 28, 1890.
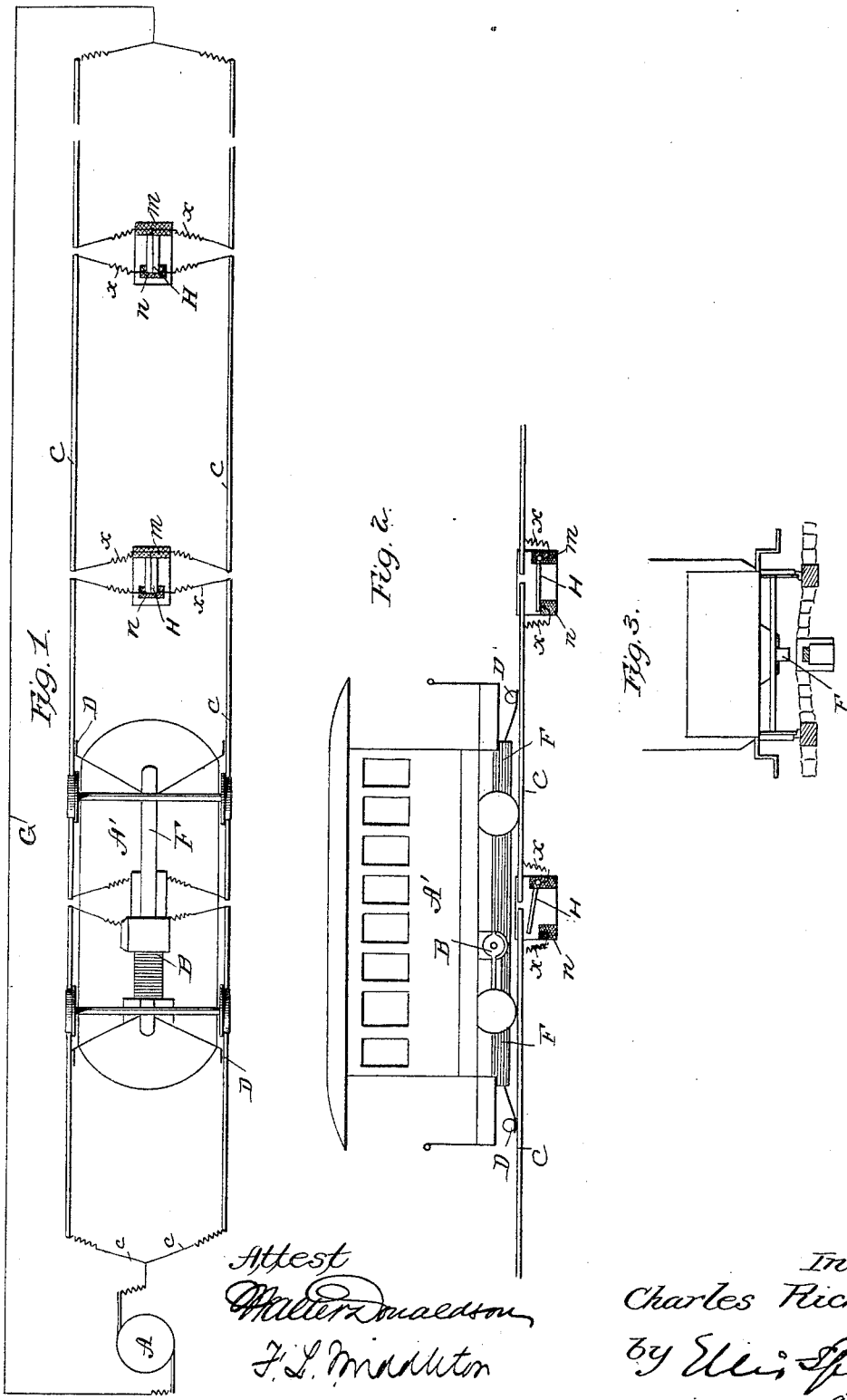
Attest
Walter Donaldson
F. L. Middleton
Inventor
Charles Richter
by Ellis Spear
Atty.

(No Model.) 3 Sheets—Sheet 2.
C. RICHTER.
ELECTRIC RAILWAY.
No. 439,428. Patented Oct. 28, 1890.
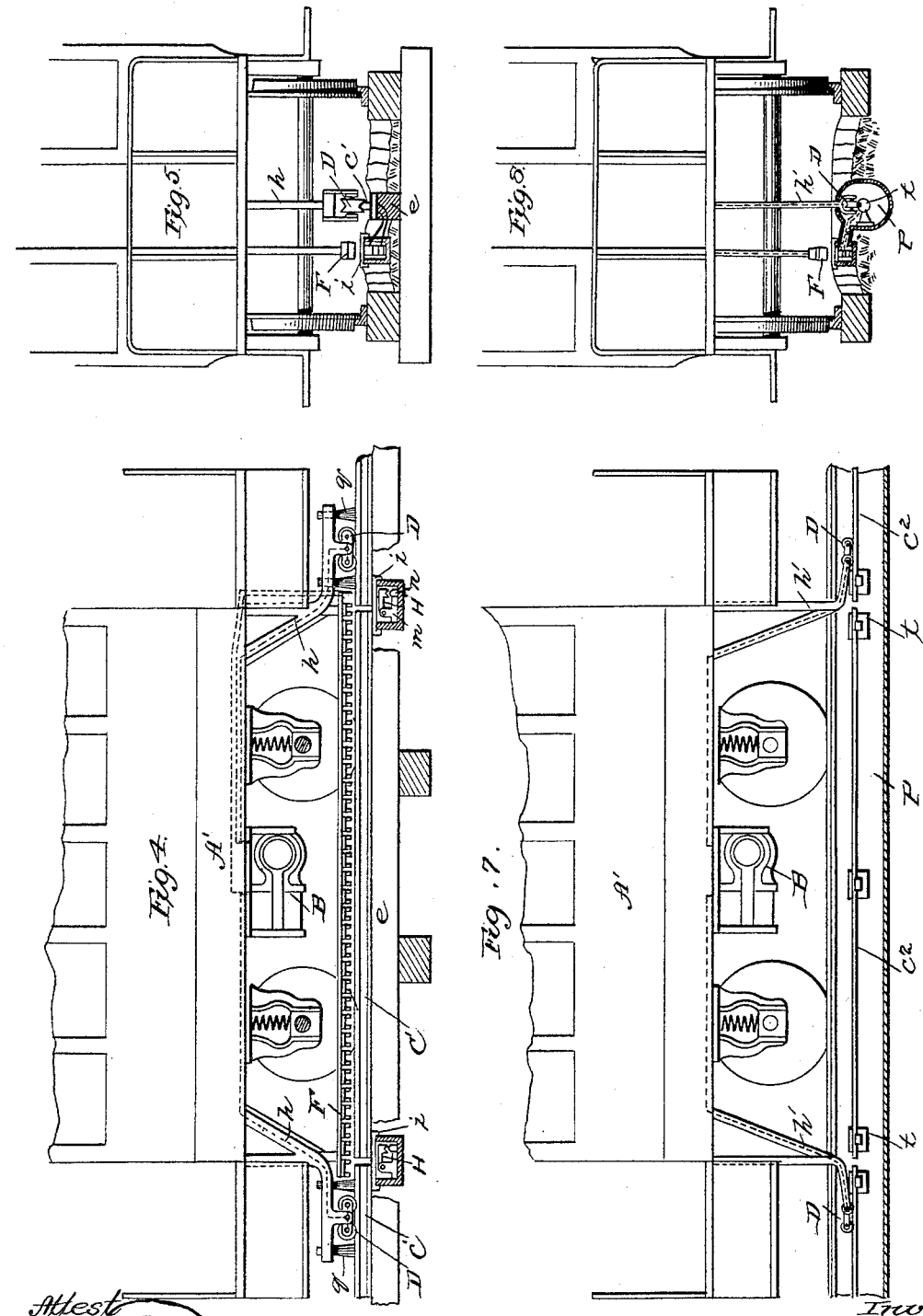

(No Model.) 3 Sheets—Sheet 3.

C. RICHTER.
ELECTRIC RAILWAY.

No. 439,428. Patented Oct. 28, 1890.

Attest  
Walter Donaldson  
F. L. Middleton

Inventor  
Charles Richter  
by Ellis Spear  
Atty.

UNITED STATES PATENT OFFICE.

CHARLES RICHTER, OF CAMDEN, NEW JERSEY, ASSIGNOR TO THE ELECTRIC CONSTRUCTION COMPANY OF NEW JERSEY.

ELECTRIC RAILWAY.

SPECIFICATION forming part of Letters Patent No. 439,428, dated October 28, 1890.

Application filed August 11, 1890. Serial No. 361,725. (No model.)

*To all whom it may concern:*

Be it known that I, CHARLES RICHTER, a citizen of the United States of America, residing at Camden, in the county of Camden and State of New Jersey, have invented certain new and useful Improvements in Electric Railways, of which the following is a specification.

Application has been made by me for this invention in the Dominion of Canada, under date of August 29, 1890, Serial No. 54,337.

The invention hereinafter set forth and the subject of the foregoing petition relates to electric railways of that class in which the cars are run by means of motors arranged in a series with a sectional electric conductor.

The system in which the invention is embodied is designed to be used in connection with one or more dynamos supplying a constant current of great quantity and low pressure of electric motive force; but it is not limited thereto. The use of such quantity and force, which are adapted to the system hereinafter described, enables the rails to be utilized as conductors. I have shown in this application a form in which the rail is so utilized; but I have also shown a conductor which may be placed between the rails and used instead of them, either upon the surface or in a conduit.

Figure 6:
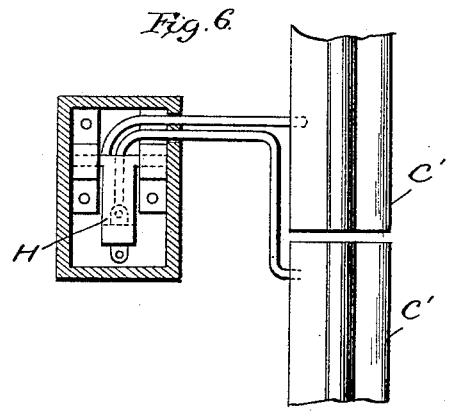
Figure 9:
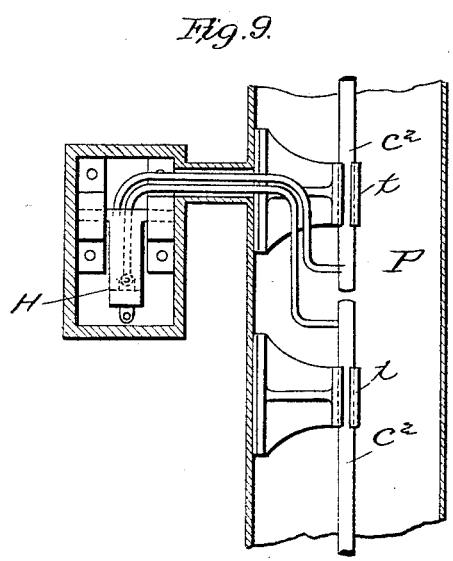

In the accompanying drawings, which illustrate my invention, Figure 1 is a plan view of the form of embodiment in which the rails are utilized as conductors. Fig. 2 is a side elevation of parts, in section, of the same; Fig. 3, a cross-section of the same. Fig. 4 shows in side elevation a road in which the same system is used with an independent conductor between the rails. Fig. 5 is a cross-section of the same; Fig. 6, a plan view of details, hereinafter explained. Figs. 7, 8, and 9 are similar views of another form of the invention, in which the independent conductor is located in the conduit between the rails.

In the drawings, Figs. 1, 2, and 3, which illustrate the form in which the rails are used as conductors, these rails are represented as laid in sections, (marked C.) Each section is separate from the two contiguous sections of the same line of rails; but all are connected by switches arranged between the sections.

In the form shown in the three figures above referred to both rails are shown as used to conduct the current from the positive pole of dynamo; but obviously a single rail may be used with substantially the same effect. Both rails being shown as utilized, they are represented as connected to the positive pole of the dynamo A by connections $c$. The sections are connected at their contiguous ends by wires $x$ to a common switch, which connects the co-terminus rails of each section of the two lines with those of another section, and these switches are normally closed, so that the line is continuous through the rails alone when no car is run upon the track.

The car shown in the figure is marked A', which carries an electric motor, which is indicated at B, and this motor has its poles connected to the contact rollers or brushes D— one at each end of the car—and the points of contact of these brushes or rollers are separated by a distance upon the rails a little greater than the length of any section, so that the car may with these points of contact bridge the whole section of rail, including the space at one end to separate that section from the other rails contiguous thereto. The car also carries a magnet F, depending therefrom in line with the series of switches, and adapted to operate the switch and hold it open while the car is passing over it, so as to put the current from one contact-point through the motor on the car and thence to the other contact-point while said switch is thus held open. This is the general principle of the invention, and with some variation of detail is the same in all the figures.

Referring to the switches, they are located, as represented in the drawings, midway between the rails and opposite the spaces between the sections. The switch H is in the form of an iron bar or plate which is pivoted upon an insulated block $m$, and is connected by one set of wires $x$ to the sections of the co-terminus rails. At one end thereof, in like manner, the contiguous ends of the next section are connected by the connections $x$ to a contact-piece on a block $n$, the contact-piece being directly under the free end of the switch H, so that when the switch drops by gravity it will engage with said contact-piece and form a perfect electrical connection therewith, the switch being made sufficiently heavy for that purpose. Any suitable form of contact may be provided for the more effectual connection of the lateral parts.

The magnet is shown at F. It may be of any suitable kind, either a permanent magnet or an electro-magnet energized by a current from the line. The magnet is arranged longitudinally of the car and in line with the series of switches, so that as the car passes over a switch the forward end of the conductor at once by its attraction raises the switch H and holds it up and open as long as the magnet is passing over it, and the length of the magnet is so proportioned to the distance between the contact-points of the rollers or brushes D that one switch is closed just before the next is opened.

While the switch is open and the car is in substantially the position shown in Fig. 2 it will be apparent that the current will be interrupted along the rails, and will be forced through the motor from the contact-point in rear to the contact-point in front. The arrangement is such that it provides for the opening of the circuit through the motor at the instant the magnets F approach the switch, and they keep it open until the car is passed from it, when it will automatically close the circuit by dropping to its original position before the contact rollers or brushes leave the rear sections, and thus a break in the circuit is prevented. In the form shown in these figures the circuit is completed by means of a return-conductor G, which is connected to the negative pole of the dynamo.

In Figs. 4 to 6, inclusive, the parts are the same and have the same marks as those in the figures heretofore described, excepting that a separate rail is used for the conductor, and the arrangement of the switches is accordingly slightly changed. The electric conducting-rail is shown at $c'$ in cross-section in that figure. It is located, preferably, midway between the other two rails and is supported upon a beam $e$, between which and the rail is interposed a copper conducting-strip to reduce the resistance, and on this the iron rail directly rests. The switches have the same location in relation to the spaces between the sections as before described, but they are located between the center rail and one side rail, as shown in Fig. 5. They are located in the boxes, having a suitable cover $i$, and directly over it is arranged the magnet F. The construction of the switch is the same as that heretofore described, and the parts are respectively connected to the contiguous rail ends in the same manner as in the former figures. The contact rollers or brushes are supported upon brackets $h$, rollers being shown in the figures, these bearing on the rail, as shown in Fig. 5. Brushes $q$ are located to bear on the conductor-rail to keep its surface clean and effect the contact.

In Figs. 7, 8, and 9 the same parts are shown with the same letters of reference, excepting that the conduit is provided for an electrical conductor, so that it may be arranged beneath the surface and be protected from the surface travel, the conduit being, as shown at P, in cross-section in Fig. 8. The contact rollers or brushes are supported upon brackets $h'$. The conductor is supported upon brackets $t$, fixed to the wall of the conduit and arranged to hold the conductor-sections with an upper surface exposed, as shown in Fig. 9, the sections being properly insulated in this as in the other forms. The brackets $h'$ are made sufficiently thin to pass through the longitudinal slot in the upper part of the conduit. The sections of the conductor are marked $C^2$.

The switches I prefer to provide with porcelain bearings, which is a material not liable to rust and interfere with their free action, and the contact-points may be fitted in any well known way to insure contact and completion of the circuit.

The conductors described in the second and third forms are provided with return-connections to the dynamo or dynamos, the same as in the form first described. In all the forms the action is the same. The current from the positive pole of the dynamo has complete circuit throughout the rails or the conductors between the rails when no car is upon the line, and when the car runs upon the lines each car as it passes the switch breaks the circuit of the conductor, and thus the current is put through the motors of the cars in series automatically.

I claim as my invention—

1. In an electric railway, a conductor composed of sections separated from each other and connected by switches, a motor with suitable contacts at each end for collecting the current from the conductor, and a magnet upon each car arranged to open and hold open the switches between the sections while the car is bridging the break, said switches returning by gravity to close the circuit after the car has passed, all substantially as described.

2. In an electric railway, a conductor composed of sections separated from each other and connected by switches, a motor carried upon a car with suitable contacts at each end for collecting the current from the conductor, and a magnet extending from end to end of the said car, arranged to open and hold open the switches between the sections while the car is bridging the break, said switches returning by gravity to close the circuit after the car has passed, all substantially as described.

3. In an electric railway, a conductor composed of sections separated from each other and connected by switches, said switches being located to one side of the main conductor to which they are suitably connected, and a magnet supported from the car in line with the position of the switches, said magnet extending from end to end of the car and adapted to open the switches and hold them open while the car is bridging the break, substantially as described.

In testimony whereof I affix my signature in presence of two witnesses.

CHARLES RICHTER.

Witnesses:
JAMES E. HAYS,
C. WESLEY WEYGAND.